(12) United States Patent
Kawamura et al.

(10) Patent No.: US 7,096,739 B2
(45) Date of Patent: Aug. 29, 2006

(54) PRESSURE SENSOR CONTAINING FLUORINE-BASED ADHESIVE

(75) Inventors: Tetsushi Kawamura, Okazaki (JP); Tomonari Yamakawa, Aichi-ken (JP); Kazushi Suzuki, Chiryu (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/735,692

(22) Filed: Dec. 16, 2003

(65) Prior Publication Data

US 2004/0177695 A1   Sep. 16, 2004

(30) Foreign Application Priority Data

Dec. 16, 2002   (JP) ............... 2002-364414

(51) Int. Cl.
*G01L 9/00* (2006.01)
(52) U.S. Cl. ...................................... 73/754
(58) Field of Classification Search ........... 73/700–756
See application file for complete search history.

(56) References Cited

U.S. PATENT DOCUMENTS

| | | | | |
|---|---|---|---|---|
| 3,817,107 A | * | 6/1974 | Shimada et al. ............. 73/727 |
| 4,342,231 A | * | 8/1982 | Yamamoto et al. ........... 73/721 |
| 4,675,643 A | * | 6/1987 | Tanner et al. ................. 338/4 |
| 5,335,549 A | * | 8/1994 | Kato ............................. 73/706 |
| 5,375,472 A | * | 12/1994 | Mitani et al. ................. 73/706 |
| 5,595,939 A | * | 1/1997 | Otake et al. .................. 438/51 |
| 5,689,089 A | * | 11/1997 | Polak et al. ................ 174/52.4 |
| 6,085,598 A | * | 7/2000 | Baba et al. .................... 73/756 |
| 6,260,417 B1 | | 7/2001 | Watanabe et al. |
| 6,298,730 B1 | * | 10/2001 | Yamagishi et al. ........... 73/723 |
| 6,453,747 B1 | * | 9/2002 | Weise et al. .................. 73/715 |
| 6,512,255 B1 | * | 1/2003 | Aoki et al. .................. 257/254 |
| 6,678,164 B1 | * | 1/2004 | Chikuan et al. ............. 361/752 |
| 6,813,953 B1 | * | 11/2004 | Baba et al. .................... 73/715 |
| 2001/0028072 A1 | * | 10/2001 | Aoki et al. .................. 257/254 |
| 2002/0062698 A1 | | 5/2002 | Baba et al. |
| 2003/0184982 A1 | * | 10/2003 | Chikuan et al. ............. 361/752 |
| 2003/0200813 A1 | | 10/2003 | Baba et al. |

FOREIGN PATENT DOCUMENTS

| | | |
|---|---|---|
| EP | 1 091 201 | 4/2001 |
| FR | 2 686 692 | 7/1993 |
| JP | 9-95615 | 4/1997 |
| JP | 2819783 | 8/1998 |
| JP | 2001-099737 | 4/2001 |
| JP | 2001099737 A * | 4/2001 |

\* cited by examiner

*Primary Examiner*—Max Noori
(74) *Attorney, Agent, or Firm*—Oblon, Spivak, McClelland, Maier & Neustadt, P.C.

(57) ABSTRACT

A pressure sensor is provided with a semiconductor device that is capable of detecting a pressure, a terminal that is connected to the semiconductor device by a bonding wire, a housing having an accommodation space for the semiconductor device, the bonding wire, and the terminal, a diaphragm for sealing the accommodation space, and working fluid that is sealed in the accommodation space and transmits a pressure applied to the diaphragm to the semiconductor device. The working fluid is silicone-based oil, and the terminal and the housing are sealed by fluorine-based adhesive.

7 Claims, 4 Drawing Sheets

PRESSURE SENSOR CONTAINING FLUORINE-BASED ADHESIVE

INCORPORATION BY REFERENCE

The disclosure of Japanese Patent Application No. 2002-364414 filed on Dec. 16, 2002 including the specification, drawings and abstract is incorporated herein by reference in its entirety.

BACKGROUND OF THE INVENTION

1. Field of the Invention

The present invention relates to a pressure sensor.

2. Description of the Related Art

As an example of a conventional pressure sensor, a pressure sensor disclosed in Japanese Patent Publication No. 2819783 is known. This pressure sensor is provided with a semiconductor device that is capable of detecting a pressure, a terminal that is connected to the semiconductor device by a bonding wire, a housing having an accommodation space for accommodating the semiconductor device, the bonding wire and the terminal, a diaphragm for sealing the accommodation space, and working fluid that is sealed in the accommodation space and transmits a pressure applied to the diaphragm to the semiconductor device. Fluorine-based oil that is composed of perfluoro polyether is used as the working fluid. In general, silicone-based adhesive is used in this type of the pressure sensor for sealing between the terminal and the housing.

In this pressure sensor, the diaphragm is deformed when a pressure to be detected acts on the diaphragm, and the pressure is transmitted to the semiconductor device by the working fluid. The semiconductor device detects the pressure, a signal of the pressure is sent to the terminal via the bonding wire, and is then sent to other devices by the terminal. In this case, in this pressure sensor, while the fluorine-based oil as the working fluid maintains favorable pressure transmissibility, swelling of the silicone-based adhesive is prevented due to characteristics of fluorine compound and silicone compound. Accordingly, in this pressure sensor, reduction in adhesivity of the silicone-based adhesive is prevented, whereby sealability between the terminal and the housing is maintained and durability is also demonstrated.

Furthermore, a pressure sensor such as that disclosed in Japanese Patent Laid-Open Publication No. 2001-99737 is also known. This pressure sensor is provided with a semiconductor device that is capable of directly detecting a pressure, a terminal that is connected to the semiconductor device by a bonding wire, and a housing having an accommodation space for accommodating the semiconductor device, the bonding wire, and the terminal, and but is not provided with the aforementioned diaphragm. Moreover, the semiconductor device, the bonding wire, and the terminal are buried in fluorine-based gel that is tilled in the accommodation space as the working fluid, and further, an upper portion of then terminal and the housing are coated with fluorine-based adhesive.

In this pressure sensor, when a pressure to be detected acts on the surface of the fluorine-based gel, the pressure is transmitted to the semiconductor device by the fluorine-based gel. The semiconductor device detects the pressure, a signal of the pressure is sent to the terminal via the bonding wire, and is then sent to other devices by the terminal. In this case, in this pressure sensor, the fluorine-based gel and the fluorine-based adhesive demonstrate durability by being exposed to gasoline vapor, water vapor, or the like.

However, since the pressure sensor disclosed in Japanese Patent Publication No. 2819783 uses expensive fluorine-based oil as the working fluid, a large amount of the fluorine-based oil is used, thus causing an increase in the manufacturing cost. If low-cost silicone-based oil is used as the working fluid instead of the fluorine-based oil, since the terminal and the housing are sealed by the silicone-based adhesive, the silicone-based adhesive swells due to joint characteristics of silicone resin, thus reducing adhesivity. As a result, sealing between the terminal and the housing becomes insufficient, thereby causing a concern about durability.

Furthermore, in the pressure sensor disclosed in Japanese Patent Laid-Open Publication No. 2001-99737 uses both fluorine-based gel and fluorine-based adhesive for protection from outside environment. Therefore, the manufacturing cost increases.

SUMMARY OF THE INVENTION

The present invention has been devised in consideration of the above problems. It is an object of the present invention to provide a pressure sensor with which a pressure can be detected with high sensitivity, and a low manufacturing cost can be achieved.

A pressure sensor of a first aspect of the present invention includes a semiconductor device that is capable of detecting a pressure, a terminal that is connected to the semiconductor device by a bonding wire, a housing having an accommodation space for accommodating the semiconductor device, the bonding wire and the terminal, a diaphragm for sealing the accommodation space, and working fluid sealed in the accommodation space for transmitting a pressure that is applied to the diaphragm to the semiconductor device. In this pressure sensor, the working fluid is silicone-based oil, and the terminal and the housing are sealed by a fluorine-based adhesive.

A pressure sensor of a second aspect of the present invention includes a semiconductor device that is capable of directly detecting a pressure, a terminal that is connected to the semiconductor device by a bonding wire, and a housing having an accommodation space for accommodating the semiconductor device, the bonding wire and the terminal. In this pressure sensor, the terminal and the housing are sealed by the fluorine-based adhesive.

According to the results of tests conducted by the inventors, it is preferable for the pressure sensor of the first and second aspects of the present invention that the fluorine-based adhesive is perfluoro polyether resin composition.

DETAILED DESCRIPTION OF THE PREFERRED EMBODIMENTS

Hereinafter, first and second embodiments of the present invention will be explained with reference to the accompanying drawings.

First Embodiment

Figure 1:
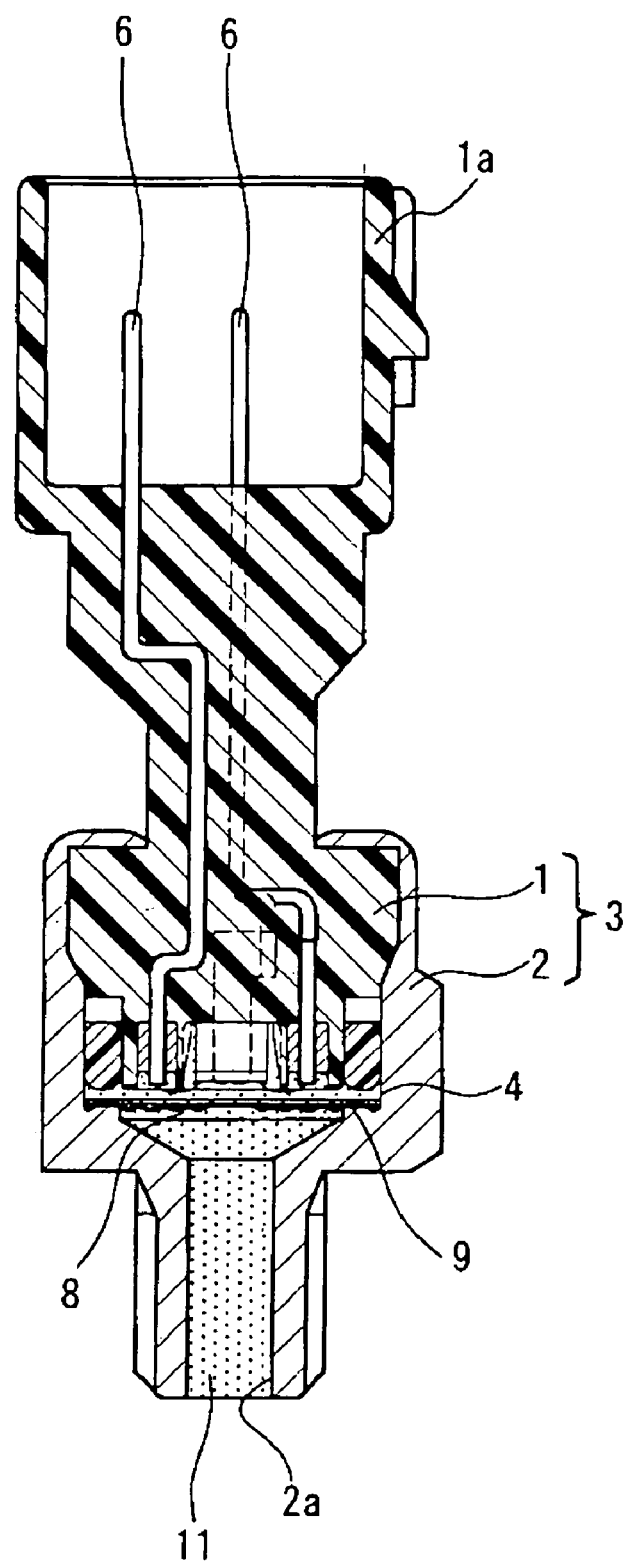
FIG. 1 is a cross sectional view showing a pressure sensor according to a first embodiment of the present invention.

A pressure sensor according to a first embodiment of the present invention is provided with a housing 3, a diaphragm 8 and working fluid 9 as shown in FIG. 1. The housing 3 is composed of a first housing 1 made from, for example, PPS (polyphenylene sulfide) and a second housing 2 that is made from steel and provided on the periphery of one end of the first housing 1. The one end of the first housing 1 forms an accommodation space 4 with the second housing 2. The accommodation space 4 is sealed by the diaphragm 8 that is sandwiched between the first housing 1 and the second housing 2. In addition, a connector 1a for external electrical connection is formed on the other end of the first housing 1. One end of the second housing 2 is provided with an introducing hole 2a that penetrates therethrough for introducing a detected substance 11 to the side of the diaphragm 8. The other end of the second housing 2 is caulked to the first housing 1. In addition, the working fluid 9 of the silicone-based oil is sealed in the accommodation space 4.

Figure 2:
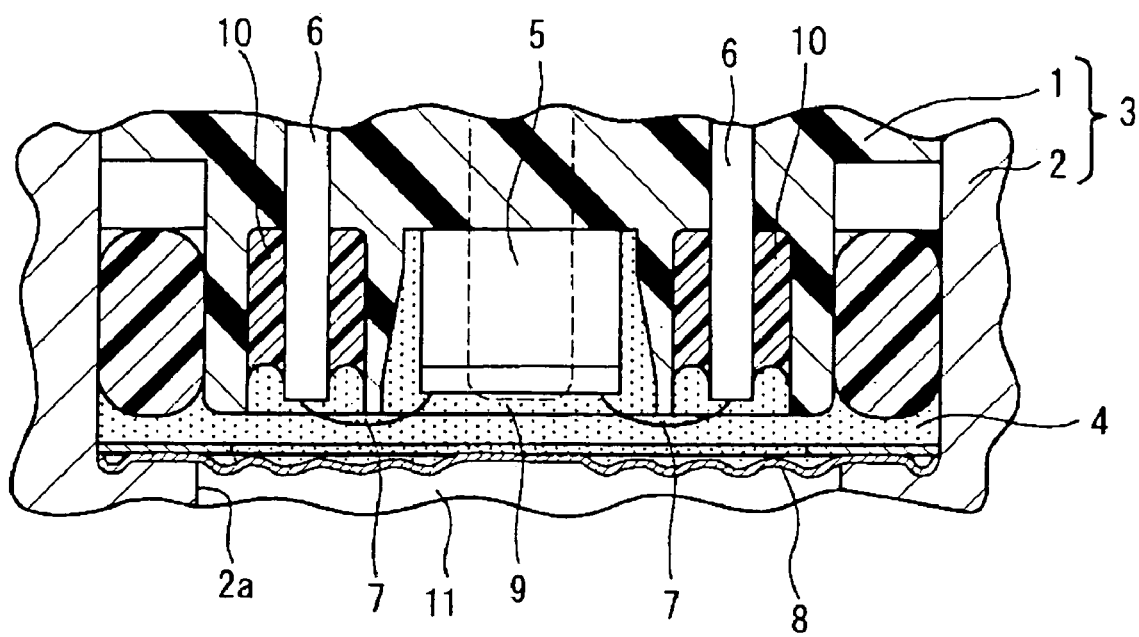
FIG. 2 is an enlarged cross sectional view showing a pressure sensor according to the first embodiment of the present invention.

As shown in FIG. 2, the semiconductor device 5 that is capable of detecting a pressure and the terminal 6 that is connected to the semiconductor device 5 by the bonding wire 7 are accommodated in the accommodation space 4. The semiconductor device 5 is adhered to the first housing 1. In addition, as shown in FIG. 1, the terminal 6 is provided to penetrate through the first housing 1 such that one end is protruded to the accommodation space 4 and the other end is protruded to the inside of the connector 1a. An end of the terminal 6 is, as shown in FIG. 2, integrally adhered to the first housing 1 by the fluorine-based adhesive 10 in a sealed state, thus preventing working fluid from leaking from a minute gap between the terminal 6 and the first housing 1. In the present embodiment, a perfluoro polyether resin composition (SIFEL614 made by Shin-Etsu Chemical Co., Ltd.) is adopted as the fluorine-based adhesive 10.

In the pressure sensor configured as above, the diaphragm 8 receives a pressure of the detected substance 11 that is introduced from the introducing hole 2a of the second housing 2, and the pressure is transmitted to the semiconductor device 5 by the working fluid 9. Then, the pressure is converted to an electric signal by the semiconductor device 5. This electric signal is taken outside via the bonding wire 7 and the terminal 6 of the connector 1a.

In this case, in the pressure sensor, the silicone-based oil which is the working fluid 9 maintains favorable pressure transmissibility. In addition, the fluorine-based adhesive 10 demonstrates favorable adhesive performance. Furthermore, swelling of the fluorine-based adhesive 10 is prevented due to joint characteristics of the silicone compound and the fluorine compound. As a result, in the pressure sensor, sealability between the terminal 6 and the first housing 1 is maintained by preventing reduction in adhesivity of the fluorine-based adhesive 10, thus durability is demonstrated. Moreover, since the silicone-based oil is less expensive than the fluorine-based adhesive 10, an increase in a manufacturing cost is not caused even when a large amount of the silicone-based oil is used as the working fluid 9.

Therefore, a pressure can be detected with high sensitivity, and the low manufacturing cost can be achieved according to the pressure sensor of the first embodiment. In addition, adhesive performance of the recent fluorine-based adhesive has been significantly improved.

Second Embodiment

Figure 3:
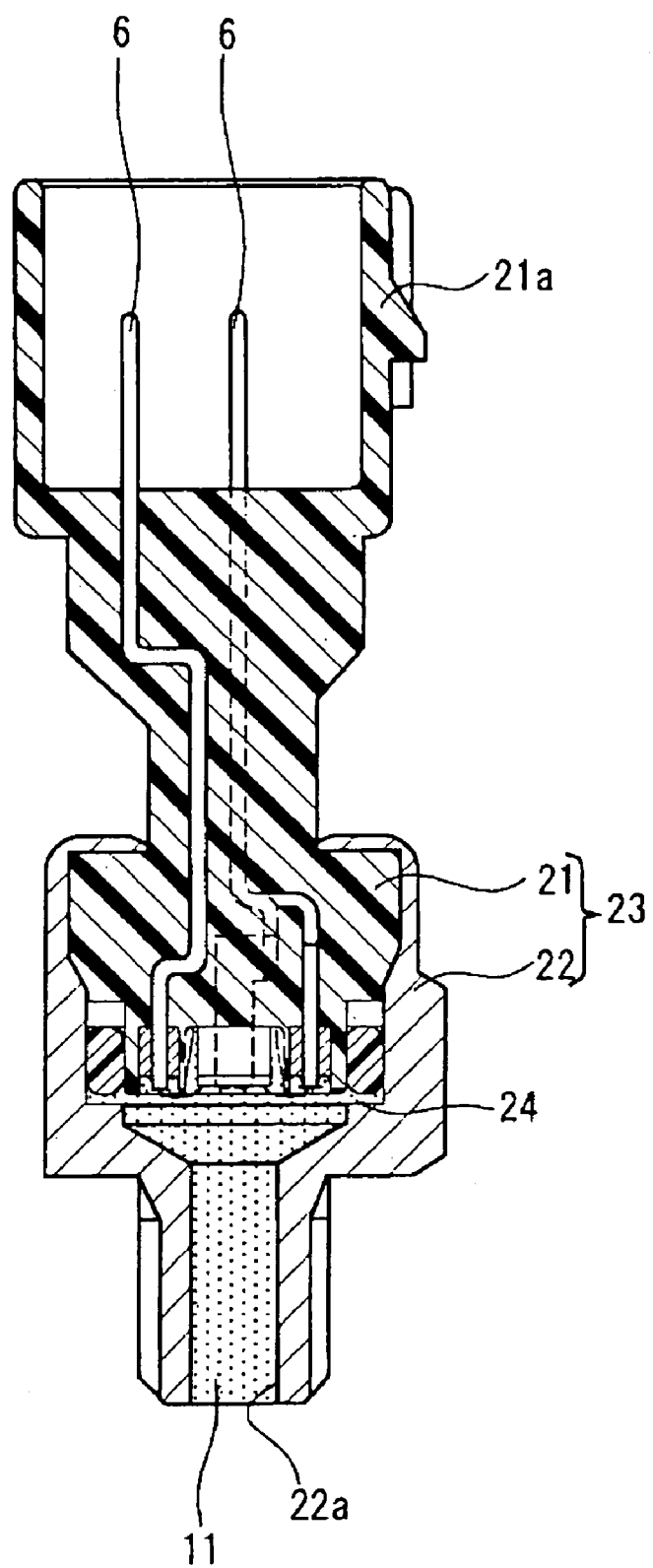
FIG. 3 is a cross sectional view showing a pressure sensor according to a second embodiment of the present invention.
Figure 4:
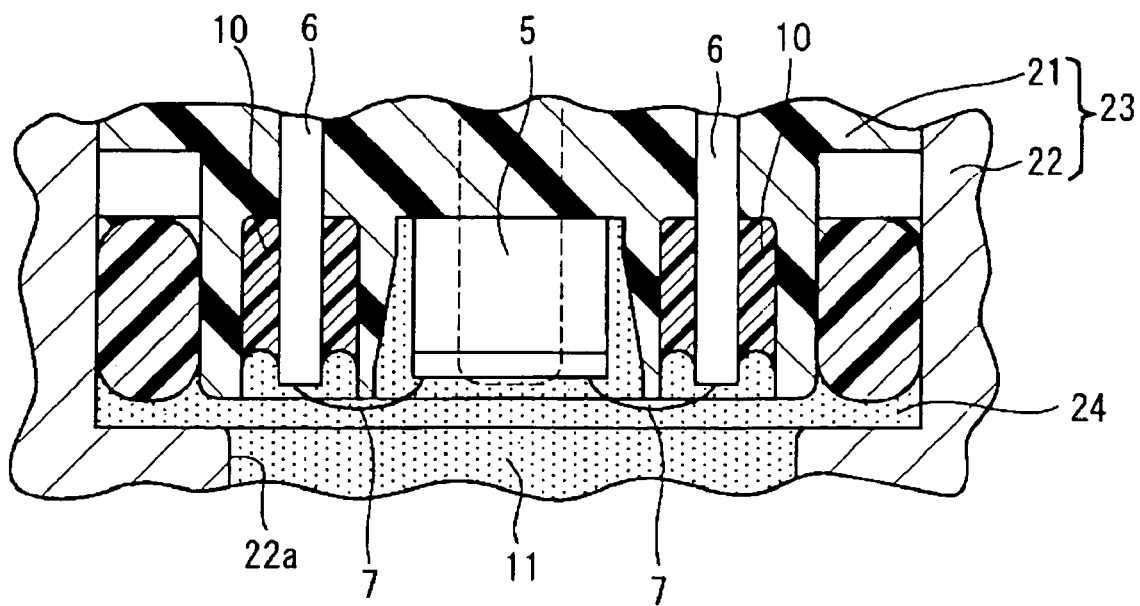
FIG. 4 is an enlarged cross sectional view showing a pressure sensor according to the second embodiment of the present invention.

As shown in FIGS. 3 and 4, a pressure sensor according to a second embodiment of the present invention is provided with a semiconductor device 5 that is capable of directly detecting a pressure, and a housing 23 having an accommodation space 24. The semiconductor device 5, a bonding wire 7, and a terminal 6 are accommodated in the accommodation space 24. The housing 23 is composed of a first housing 21 made from, for example, PPS (polyphenylene sulfide) and a second housing 22 that is made from steel and provided on the periphery of one end of the first housing 21. The one end of the first housing 21 forms the accommodation space 24 with the second housing 22. In addition, a connector 21a for external electrical connection is formed on the other end of the first housing 21. One end of the second housing 22 is provided with an introducing hole 22a that penetrates therethrough for introducing a detected substance 11. The other end of the second housing 22 is caulked to the first housing 21. The accommodation space 24 and the introducing hole 22a are communicated with each other.

The semiconductor device 5 is adhered to the first housing 21. In, addition, the terminal 6 is provided to penetrate through the first housing 21 such that one end is protruded to the accommodation space 24 and the other end is protruded to the inside of the connector 21a. The terminal 6 is adhered to the first housing 21 by the fluorine-based adhesive 10. In the second embodiment, a perfluoro polyether resin composition (SIFEL614 made by Shin-Etsu Chemical Co., Ltd.) is also adopted as the fluorine-based adhesive 10.

In the pressure sensor configured as above, a pressure of the detected substance 11 that is introduced from the introducing hole 22a of the second housing 22 is directly transmitted to the semiconductor device 5. Then, the pressure is converted to an electric signal by the semiconductor device 5. This electric signal is taken outside via the bonding wire 7 and the terminal 6 of the connector 21a.

In this case, in the pressure sensor, the terminal 6 and the first housing 21 are sealed only by the fluorine-based adhesive 10 whose adhesive performance has been significantly improved. A sealing function of the fluorine-based adhesive 10 reliably prevents the detected substance 11 from leaking from a minute gap between the terminal 6 and the first housing 21. In addition, the working fluid is not provided, therefore, the low manufacturing cost can be achieved.

Therefore, a pressure can be detected with high sensitivity, and the low manufacturing cost can be also achieved according to the pressure sensor of the second embodiment. In addition, since the pressure sensor is not provided with a diaphragm, the low manufacturing cost can be further reduced.

In addition, It is preferable that the perfluoro polyether resin composition is a hardening resin composition that is composed of (A) a straight-chain fluoropolyether compound containing an alkenyl group in a molecule and having a perfluoro polyether structure in the back bone, (B) a fluoride-organic silicone compound having hydrogen atom bonded to a silicone atom in a molecule, and (C) a platinum group compound. This type of the fluorine-based adhesive is, for example, disclosed in Japanese Patent Laid-Open Publication No. HEI 9-95615.

The present example and embodiment are to be considered as illustrative and not restrictive and the invention not to be limited to the detail given herein, but may be modified within the scope and equivalence of the appended claims.

What is claimed is:

1. A pressure sensor including
a semiconductor device capable of detecting pressure;
a bonding wire;
a terminal that is connected to the semiconductor device by the bonding wire;
a housing having an accommodation space accommodating the semiconductor device, the bonding wire and the terminal;
a diaphragm sealing the accommodation space; and
a working fluid that is sealed in the accommodation space and transmits pressure applied to the diaphragm to the semiconductor device, wherein
the working fluid is a silicone-based oil; and
the terminal and the housing are sealed by a fluorine-based adhesive to prevent swelling of the adhesive.

2. A pressure sensor including
a semiconductor device capable of detecting pressure and in direct contact with the environment outside of the sensor;
a bonding wire;
a terminal that is connected to the semiconductor device by the bonding wire; and
a housing having an accommodation space accommodating the semiconductor device, the bonding wire and the terminal, wherein
the terminal and the housing are sealed by a fluorine-based adhesive.

3. The pressure sensor according to claim 1, wherein the fluorine-based adhesive is a perfluoro polyether resin composition.

4. The pressure sensor according to claim 2, wherein the fluorine-based adhesive is a perfluoro polyether resin composition.

5. The pressure sensor according to claim 2, wherein the pressure sensor does not include a working fluid.

6. A method of making a pressure sensor including a semiconductor device capable of detecting pressure; a bonding wire; a terminal that is connected to the semiconductor device by the bonding wire; a housing having an accommodation space accommodating the semiconductor device, the bonding wire and the terminal; a diaphragm sealing the accommodation space; and a working fluid that is sealed in the accommodation space and transmits pressure applied to the diaphragm to the semiconductor device, where the working fluid is a silicone-based oil; and the terminal and the housing are sealed by a fluorine-based adhesive, the method comprising sealing the terminal and the housing with the fluorine-base adhesive; and producing the pressure sensor of claim 1.

7. A method of making a pressure sensor including a semiconductor device capable of detecting pressure; a bonding wire; a terminal that is connected to the semiconductor device by the bonding wire; and a housing having an accommodation space accommodating the semiconductor device, the bonding wire and the terminal, where the terminal and the housing are sealed by a fluorine-based adhesive, the method comprising sealing the terminal and the housing with the fluorine-based adhesive; and producing the pressure sensor of claim 2.

* * * * *